Patented Feb. 27, 1923.

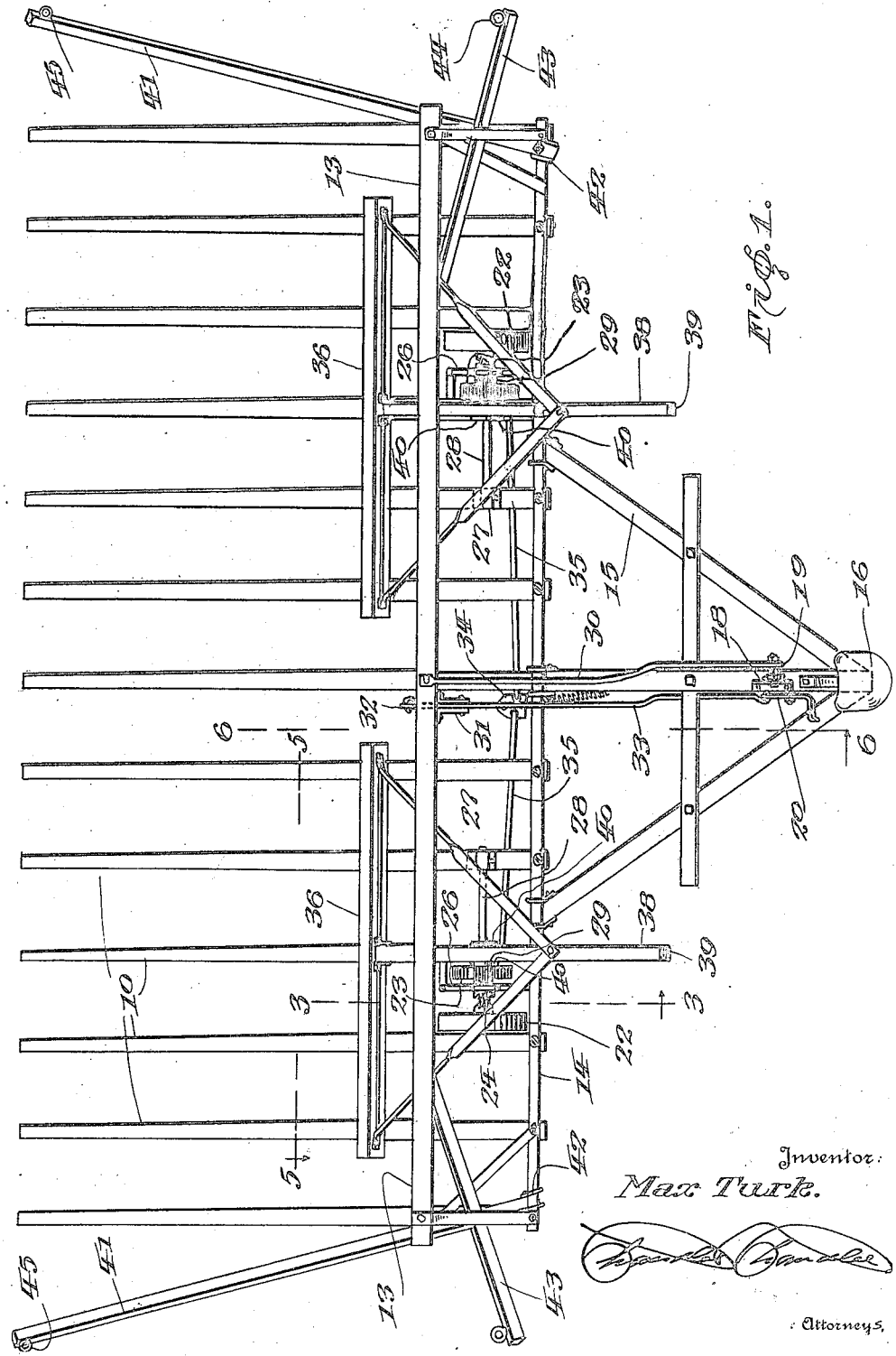

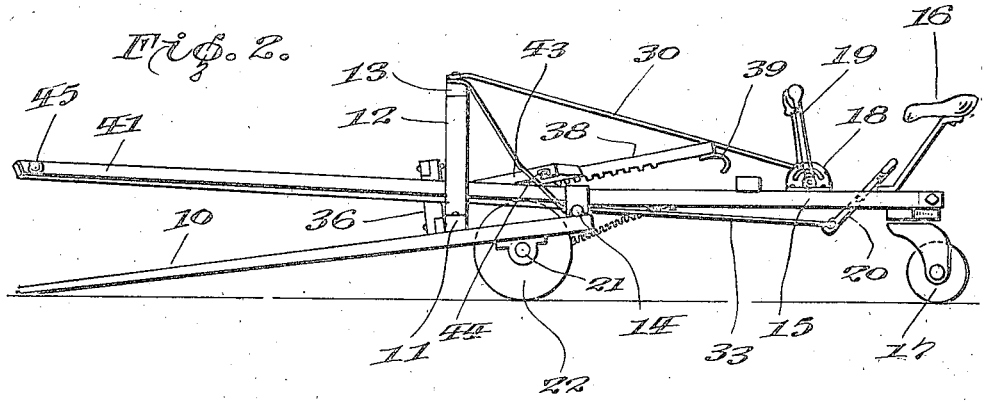
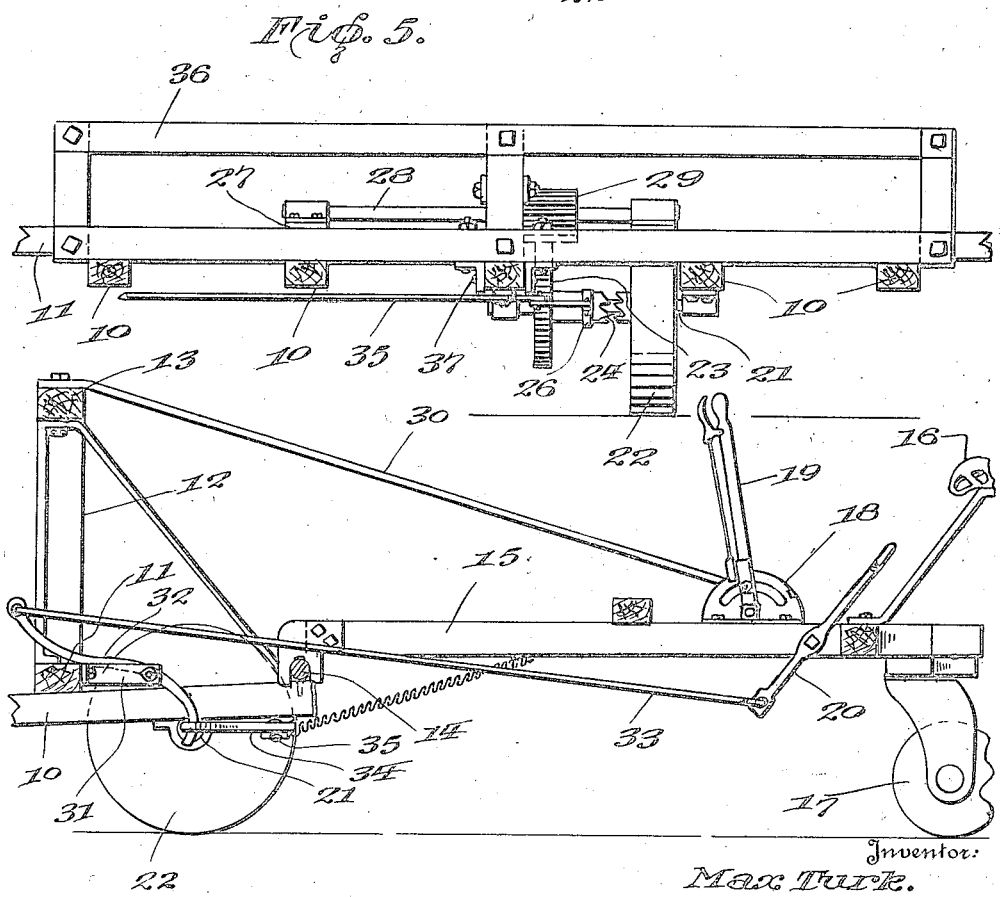

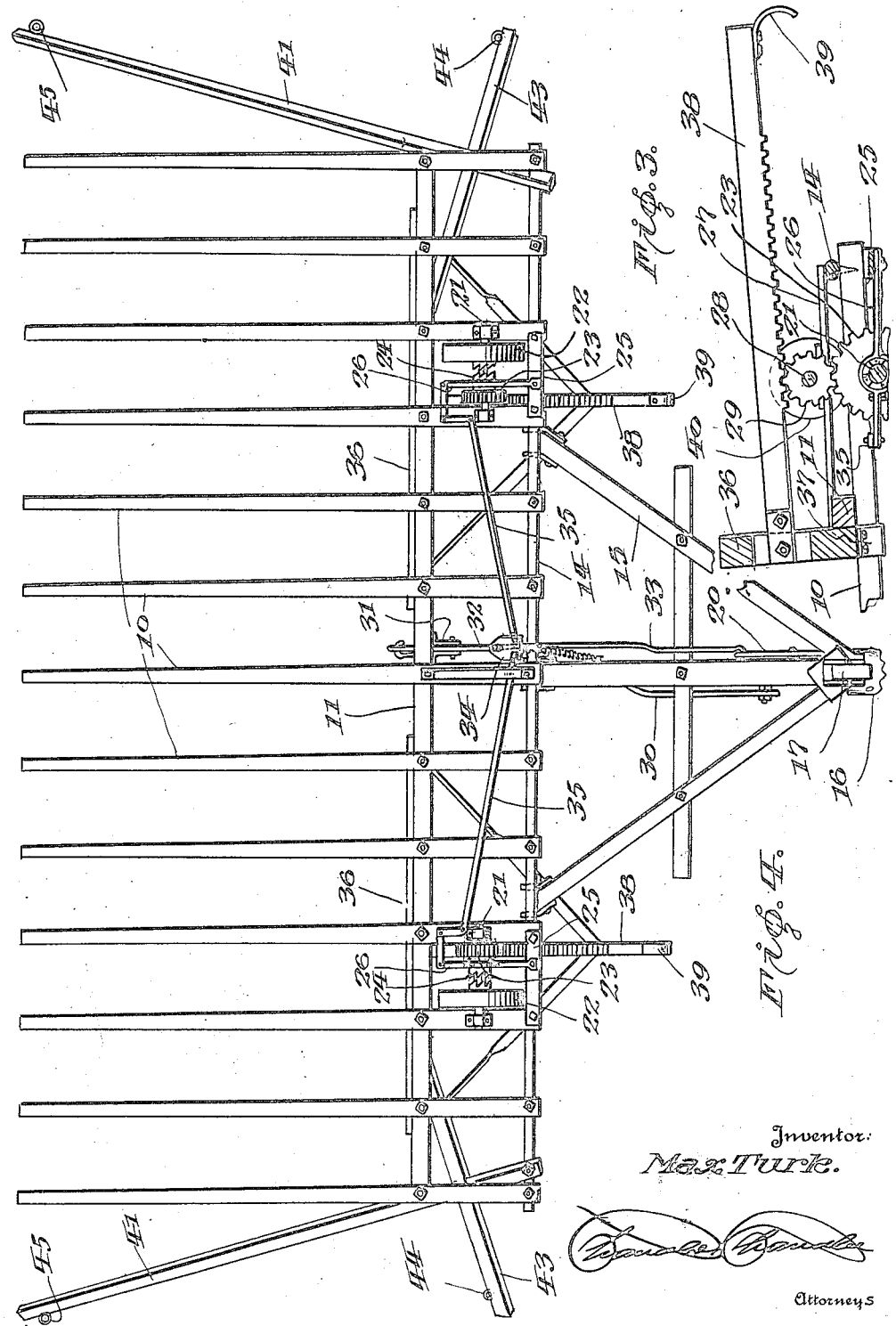

1,446,597

UNITED STATES PATENT OFFICE.

MAX TURK, OF HURON, SOUTH DAKOTA.

SWEEP RAKE.

Application filed May 23, 1921. Serial No. 471,629.

*To all whom it may concern:*

Be it known that I, MAX TURK, a citizen of the United States, residing at Huron, in the county of Beadle, State of South Dakota, have invented certain new and useful Improvements in Sweep Rakes; and I do hereby declare the following to be a full, clear, and exact description of the invention, such as will enable others skilled in the art to which it appertains to make and use the same.

This invention relates to new and useful improvements in rakes and particularly to the rakes used in sweeping hay from a field and carrying same to a stacker.

One object of the invention is to provide a device of this character which has automatic means for discharging the load of hay onto the stacker, upon movement withdrawing the rake from the stacker.

Another object is to provide means actuated by the ground wheels of the rake, and under the control of the driver, for rendering the discharging means active or inactive.

Other objects and advantages will be apparent from the following description when taken in connection with the accompanying drawings.

In the drawings:

Figure 1 is a top plan view of a sweep rake made in accordance with the invention.

Figure 2 is a side elevation of the rake.

Figure 3 is an enlarged vertical sectional view on the line 3—3 of Figure 1, showing the means for operating the hay discharging members.

Figure 4 is a bottom plan view of the rake, showing the levers and links for moving the gear shifting means.

Figure 5 is a transverse sectional view through one of the tines or fingers of the fork or rake, showing the discharging member engaged thereon.

Figure 6 is a vertical longitudinal sectional view on the line 6—6 of Figure 1, passing along one side of the central tine or finger of the rake, to show the lever and connections for the gear shift.

Referring particularly to the accompanying drawings, the rake includes the forwardly extending fingers or teeth 10 which are connected adjacent their rear ends by the transverse bar 11. Erected on each end of the bar 11 is an upright 12, and secured to the upper ends of the uprights, and extending in parallel relation above the bar 11, is a bar 13. On the rear ends of the teeth 10 is secured a transversely extending stationary shaft 14, to which is pivotally connected the rearwardly extending, and rearwardly tapering frame 15. On the rear end of this frame 15 is mounted the driver's seat 16, a supporting caster wheel 17, the rack segment 18, and the pivoted levers 19 and 20, the former of which is associated with the rack segment. Supported below the rear ends of the teeth 10 are transverse shafts 21, and on the end portions of these shafts, and rotating between adjacent pairs of teeth, are the ground wheels 22. Loose on the shafts 21 are the gears 23, the hubs of which are formed with the clutch faces 24 for engagement with the clutch faces of the ground wheels 22. Pivotally supported for horizontal swinging movement, on the brackets 25, carried by the rear ends of the teeth 10, immediately in rear of each ground wheel 22, is a lever 26, the same being operatively engaged with the gear 23, for moving the same longitudinally on the shaft 21.

Supported on brackets 27, above the rear ends of certain of the teeth 10, and above the shafts 21, are the shafts 28, each having rotatably disposed thereon the long gear 29, which is meshed by the gear 23. The gears 23 remain in engagement with the gears 29, at all times, but rotate the latter gears only when the gears 23 are moved along the shafts 21 to clutch them with the ground wheels 22.

Connected to the intermediate portion of the upper transverse bar 13, and to the lever 19, is a lifting link 30, by means of which the driver, from his seat, can rock the rake, on the bar or shaft 14, to elevate the forward ends of the teeth of the rake above the ground, as when a sufficient quantity of hay is on the rake and the rake is being moved to the stacker. Extending rearwardly from the intermediate portion of the transverse bar 11 is a bracket 31, and pivotally supported on this bracket is a rock lever 32, the upper end of said lever being connected with the lever 20 by means of the link 33, while the lower end is engaged in an opening in a horizontal plate 34. Pivotally connecting each of the levers 26 with the plate 34, is a link 35. Thus when the lever 20 is rocked in one direction the links 35 will be moved to rock the levers 26 and shift the gears 23 along the gears 29, and into clutching engagement with the ground wheels 22, whereupon the gears 29 will be rotated.

Slidable longitudinally on the teeth 10 are the vertical transverse pusher frames 36, each having the depending wings 37 which engage on opposite sides of the teeth of the rake, to guide the frame in its sliding movements. Connected to the rear of the frame 36 is a rack bar 38 which meshes with the long gear 29, and rides thereon. The rear end of the rack bar is provided with a downwardly extending curved projection 39 which is arranged to engage with the gear 29 to limit the outward movement of the pusher frame 36. Each gear 29 has on its ends the outwardly extending circumferential flanges 40 between which the rack bar 38 slides, and by which the rack is maintained in engagement with the gear.

Extending forwardly through each of the uprights 12, and inclined upwardly and laterally, are the retaining arms 41, the same being secured, at their rear ends to the brackets 42, carried by the stationary shaft 14. Secured to the transverse bar 11, and extending upwardly and laterally from the sides of the rake, are the draft arms 43, the outer ends being provided with the loops or eyes 44, for attachment of draft means. The forward ends of the arms 41 are provided with the rings 45 for connection of a strap from the bridle of the animal harness, to prevent the animal from walking too far away from the side of the rake.

While the rake is being drawn across the field, the rake is rocked downwardly so that the forward ends of the teeth 10 rest on the ground to scrape up the hay. The pusher frames 36 are in their rearmost position, against the bar 11. When a sufficient load of hay is raked on the teeth, the driver rocks the lever 19, forwardly with his hand, which tilts the rake so that the forward ends of the teeth are elevated from the ground. He then rocks the lever 20 with his foot to shift the gears 23 to clutch them with the ground wheels, whereupon the gears 29 will be rotated, with the result that when the rake is backed away from the stacker, the pusher frames 36 will be moved forwardly, by the gears 29, forcing the load of hay from the rake onto the stacker. Thus, as the teeth of the rake are withdrawn from beneath the load of hay, the pusher frames move forwardly against the hay. The driver then moves the lever 20 to disengage the gears 23 from the ground wheels 22. When the rake is again moved forwardly, the hay which is gathered onto the teeth of the rake gradually push the pusher frames 36 back into position against the bar 11. When the pusher frames have been moved back to normal position, the driver moves the lever 20 to disengage the gears 23 from the ground wheels 22.

What is claimed is:

A sweep rake comprising a rake proper including teeth, pusher frames slidable longitudinally on the teeth, rack bars extending rearwardly from the pusher frames, ground wheels mounted on the rear portions of certain of the teeth, gears movable into and out of engagement with the ground wheels, gears meshing with the first gears and with the rack bars, a lever, a rock arm, a plate, links connecting the plate with the shiftable gears, the rock arm being operatively engaged with the plate for simultaneously moving the links, and an operating link connected to the rock arm and to the said lever.

In testimony whereof, I affix my signature, in presence of two witnesses.

MAX TURK.

Witnesses:
J. P. STAHL,
LYMAN T. HINCKLEY.